US012136784B2

(12) United States Patent
Nakai

(10) Patent No.: US 12,136,784 B2
(45) Date of Patent: Nov. 5, 2024

(54) CONNECTOR

(71) Applicant: YAZAKI CORPORATION, Tokyo (JP)

(72) Inventor: Satoshi Nakai, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 210 days.

(21) Appl. No.: 17/965,769

(22) Filed: Oct. 14, 2022

(65) Prior Publication Data

US 2023/0122369 A1 Apr. 20, 2023

(30) Foreign Application Priority Data

Oct. 19, 2021 (JP) ................................ 2021-171081

(51) Int. Cl.
*H01R 13/52* (2006.01)
*H01R 13/422* (2006.01)
*H01R 13/6581* (2011.01)

(52) U.S. Cl.
CPC ....... *H01R 13/5205* (2013.01); *H01R 13/422* (2013.01); *H01R 13/5202* (2013.01); *H01R 13/6581* (2013.01)

(58) Field of Classification Search
CPC .. H01R 13/422; H01R 13/506; H01R 13/516; H01R 13/52; H01R 13/5202; H01R 13/5205; H01R 13/5208; H01R 13/521; H01R 13/5213; H01R 13/6581; H01R 13/6596; H01R 13/74
See application file for complete search history.

(56) References Cited

U.S. PATENT DOCUMENTS

| | | | | |
|---|---|---|---|---|
| 9,270,046 | B2 * | 2/2016 | Natoli | H01R 13/52 |
| 2012/0214341 | A1 * | 8/2012 | Huang | H01R 13/5205 439/583 |
| 2016/0056590 | A1 * | 2/2016 | Sugiyama | H01R 13/405 439/277 |
| 2020/0259290 | A1 * | 8/2020 | Hashii | H01R 12/58 |
| 2020/0343668 | A1 * | 10/2020 | Yamada | H01R 13/5208 |
| 2021/0391668 | A1 * | 12/2021 | Okayasu | H01R 13/6596 |
| 2022/0196016 | A1 * | 6/2022 | Nguyen | F01C 1/123 |
| 2022/0239033 | A1 * | 7/2022 | Nishijima | H01R 13/5208 |

FOREIGN PATENT DOCUMENTS

| | | | | |
|---|---|---|---|---|
| JP | 2017162594 A * | 9/2017 | | |
| JP | 2019-125470 A | 7/2019 | | |
| WO | WO-2014077220 A1 * | 5/2014 | | H01R 13/5202 |

* cited by examiner

*Primary Examiner* — Thienvu V Tran
*Assistant Examiner* — Shahzeb K Ahmad
(74) *Attorney, Agent, or Firm* — KENEALY VAIDYA LLP

(57) ABSTRACT

A connector includes: a terminal fitting; an electric wire connected to the terminal fitting; a housing in which the terminal fitting is stored, the housing constituting a fitting part with a counterpart connector; a shield shell disposed so as to surround an outer periphery of the housing; and a seal member made of rubber and sandwiched between the housing and the shield shell. The seal member has a rubber hardness of 30 degrees or more and 50 degrees or less. A value obtained by dividing a compressed height, which is a difference between a first height of the seal member before being sandwiched between the housing and the shield shell and a second height of the seal member when being sandwiched between the housing and the shield shell, by the first height is 0.1 or more and 0.4 or less.

2 Claims, 3 Drawing Sheets

CONNECTOR

CROSS-REFERENCE TO RELATED APPLICATIONS

This application is based on and claims priority under 35 USC 119 from Japanese Patent Application No. 2021-171081 filed on Oct. 19, 2021, the contents of which are incorporated herein by reference.

TECHNICAL FIELD

The present disclosure relates to a connector.

BACKGROUND ART

JP2019-125470A discloses a connector in which a shield shell is attached to a housing to prevent leakage of electromagnetic noise or the like.

SUMMARY OF INVENTION

In the connector of the type described above, in general, when a seal member such as a packing is disposed between the shield shell and the housing, relative movement between the shield shell and the housing is restricted as much as possible in order to stably enhance sealing performance for a long period of time. This is to avoid fluctuations in surface pressure of the seal member. Alternatively, the seal member is not provided, and the shield shell and the housing are in close contact with each other. However, when the displacement of each component is excessively restricted as described above, there is a possibility that the connectors cannot be properly fitted to each other due to manufacturing tolerances of the shield shell and the housing and manufacturing tolerance of a counterpart connector.

An object of the present disclosure is to provide a connector using a seal member capable of maintaining sealing performance and absorbing manufacturing tolerances at the same time.

A connector including: a terminal fitting; an electric wire connected to the terminal fitting; a housing in which the terminal fitting is stored, the housing constituting a fitting part with a counterpart connector; a shield shell disposed so as to surround an outer periphery of the housing; and a seal member made of rubber and sandwiched between the housing and the shield shell, wherein the seal member has a rubber hardness of 30 degrees or more and 50 degrees or less, and wherein a value obtained by dividing a compressed height, which is a difference between a first height of the seal member before being sandwiched between the housing and the shield shell and a second height of the seal member when being sandwiched between the housing and the shield shell, by the first height is 0.1 or more and 0.4 or less.

The present disclosure is briefly described as above. Further, details of the present disclosure will be further clarified by reading through an embodiment of the present disclosure to be described below with reference to the accompanying drawings.

DESCRIPTION OF EMBODIMENTS

Embodiment

Hereinafter, a connector 1 according to an embodiment of the present disclosure will be described with reference to the drawings. The connector 1 shown in FIG. 1 functions as a relay connector that electrically connects a pair of electric wires 20 of the connector 1 and a counterpart connector (not shown) to be fitted to the connector 1.

Figure 1:
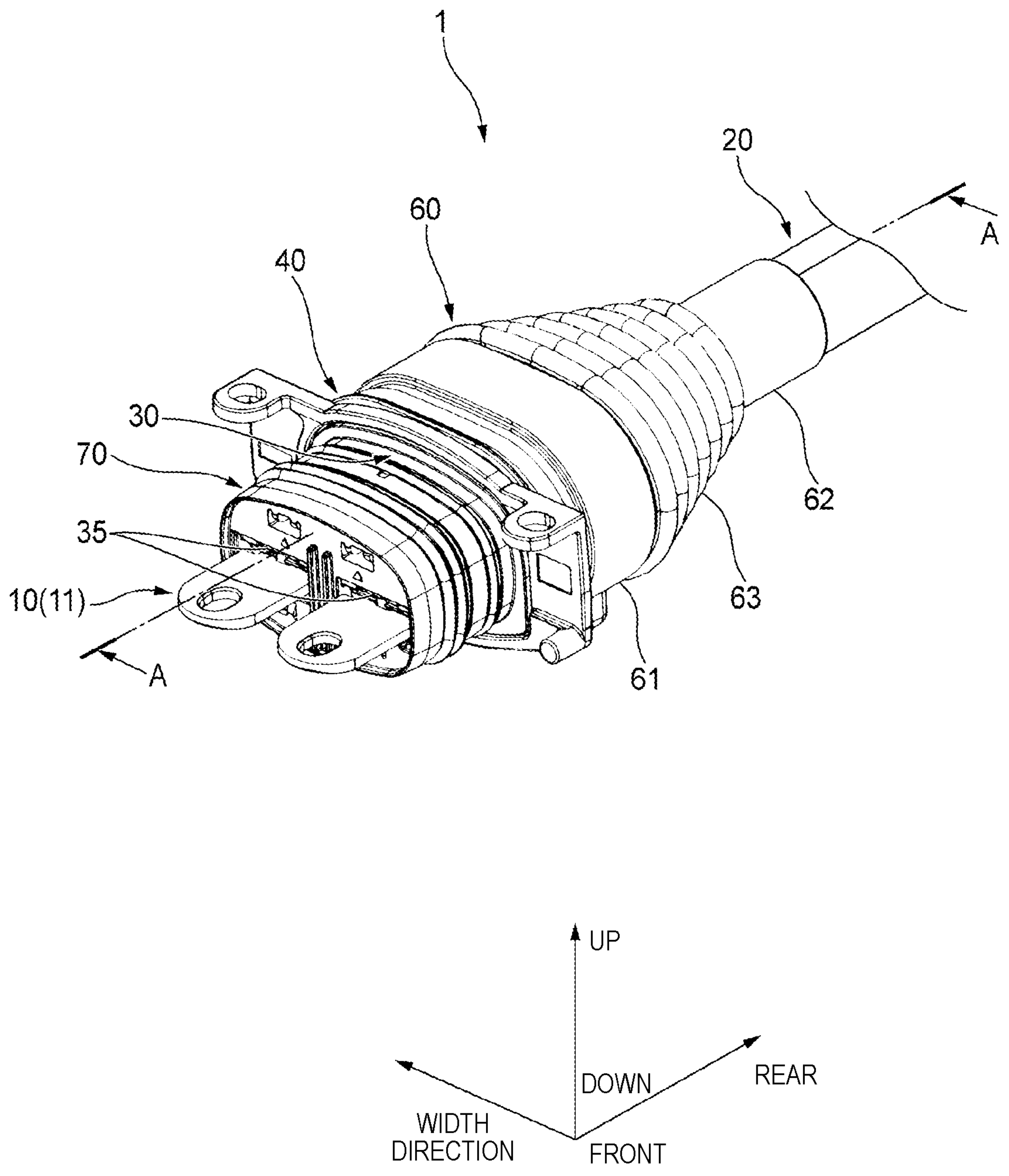
FIG. 1 is a perspective view showing a connector according to an embodiment of the present disclosure.
Figure 2:
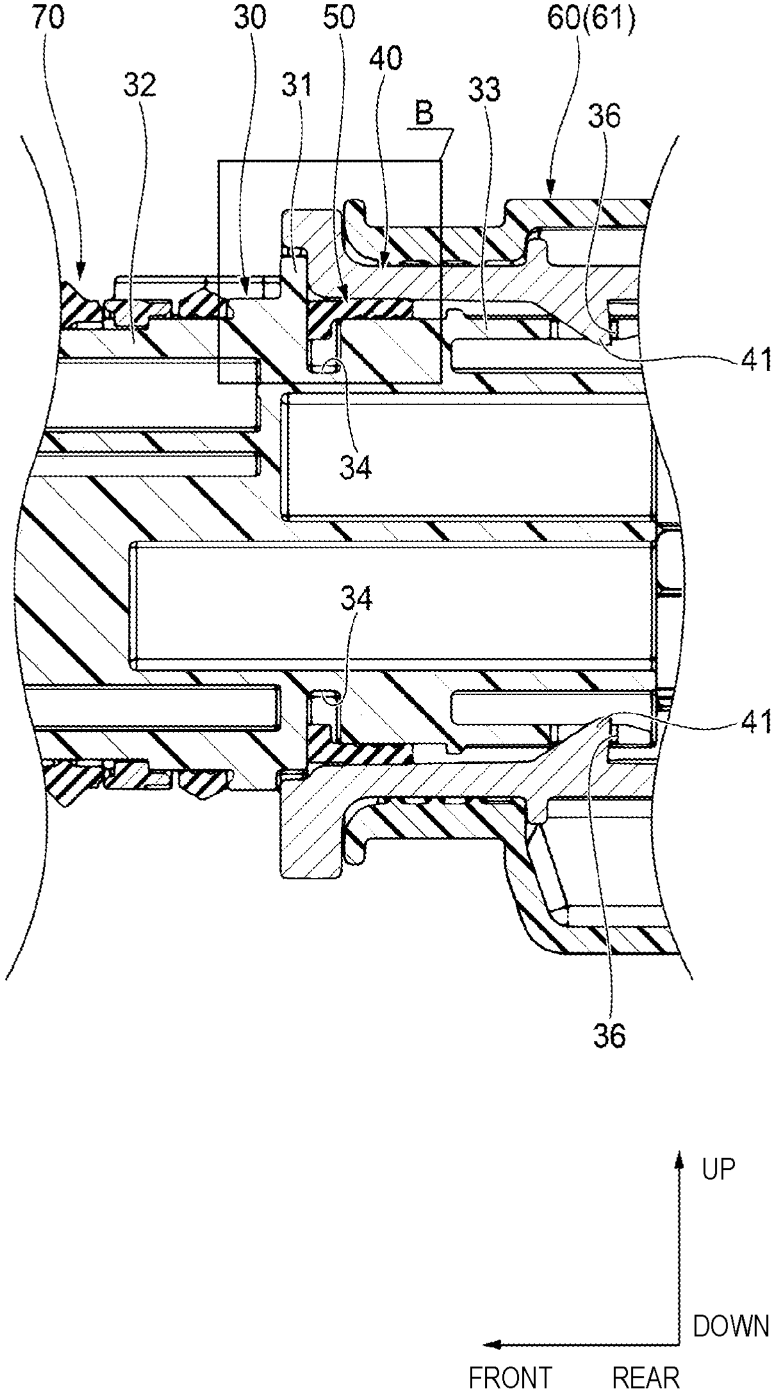
FIG. 2 is a view showing a main part on a cross section taken along a line A-A of FIG. 1.
Figure 3:
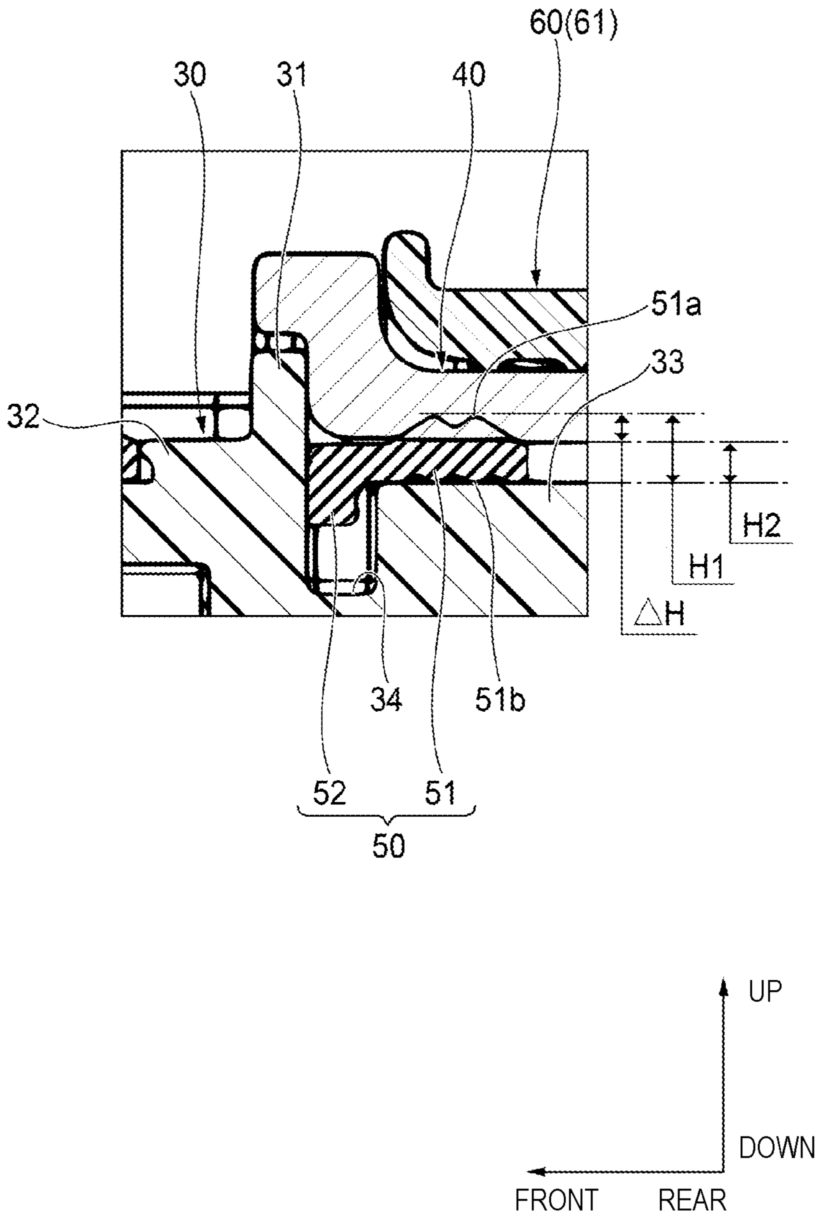
FIG. 3 is an enlarged view of a portion B in FIG. 2.

Hereinafter, for convenience of description, as shown in FIGS. 1 to 3, a "front-rear direction", an "upper-lower direction", and a "width direction" are defined. The "front-rear direction", the "upper-lower direction", and the "width direction" are orthogonal to each other. The front-rear direction coincides with a fitting direction of the connector 1 and the counterpart connector, and "front" and "rear" respectively correspond to an advancing side and a retreating side of the fitting of the connector 1 with the counterpart connector.

As shown in FIGS. 1 and 2, the connector 1 includes a pair of terminal fittings 10, a pair of electric wires 20 connected to the pair of terminal fittings 10, a housing 30 in which the pair of terminal fittings 10 is stored, a shield shell 40 mounted on the housing 30 from a rear side, a seal member 50 sandwiched between the housing 30 and the shield shell, a boot 60 covering the shield shell 40 and the pair of electric wires 20, and a packing 70 mounted on the housing 30 from a front side. Hereinafter, each member constituting the connector 1 will be described in order.

First, the terminal fitting 10 and the electric wire 20 will be described. The terminal fitting 10 is formed by performing pressing, bending and the like on a metal plate and has a shape extending in the front-rear direction. The terminal fitting 10 integrally includes an elongated flat plate-shaped terminal portion 11 (see FIG. 1) extending in the front-rear direction, and a connection portion (not shown) located at a rear end portion of the terminal portion 11. An end portion of the electric wire 20 is connected to the connection portion of the terminal fitting 10.

The electric wire 20 includes a conductor core wire made of metal and an insulating sheath covering the conductor core wire. At the end portion of the electric wire 20, the insulating sheath is removed to expose the conductor core wire, and the connection portion of the terminal fitting 10 is crimped and fixed to the exposed conductor core wire. Thus, the electric wire 20 connected to the terminal fitting 10 extends rearward from the connection portion of the terminal fitting 10.

Next, the housing 30 will be described. The housing 30 is a resin molded product. As shown in FIGS. 1 and 2, the housing 30 has a tubular shape extending in the front-rear direction, and has a flat shape elongated in a width direction when viewed in the front-rear direction. A flange portion 31 that protrudes outward in a radial direction is formed on an outer periphery of a central portion of the first housing 30 in the front-rear direction over the entire periphery. A portion of the housing 30 on the front side of the flange portion 31 constitutes a fitting portion 32 that is inserted into and fitted to a tubular counterpart fitting portion (not shown) of the counterpart connector, and a portion of the first housing 30 on the rear side of the flange portion 31 constitutes an insertion portion 33 that is inserted into the shield shell 40 (see FIG. 2). An annular groove portion 34 recessed inward in the radial direction is formed in a boundary portion between the insertion portion 33 and the flange portion 31 (see FIG. 2).

In the housing 30, a pair of terminal insertion holes 35 (see FIG. 1) and a pair of terminal storing chambers (not shown) are formed in this order from the front side toward the rear side at respective pairs of positions arranged at intervals in the width direction so as to communicate with each other in the front-rear direction. A front end of the terminal insertion hole 35 opens to a front end of the first housing 30 (a front end of the fitting portion 32), and a rear end of the terminal storing chamber opens to a rear end of the first housing 30 (a rear end of the insertion portion 33).

The pair of terminal fittings 10 to which end portions of the pair of electric wires 20 are connected are stored in the housing 30. Therefore, each terminal fitting 10 is inserted into the housing 30 from the rear side. As a result, the terminal portions 11 are inserted into the corresponding terminal insertion holes 35, and the connection portions are stored in the corresponding terminal storing chambers. In a state in which the terminal fittings 10 are completed inserted, front portions of the pair of terminal portions 11 protrude forward from the front end of the housing 30 (the front end of the fitting portion 32) (see FIG. 1), and the pair of electric wires 20 extending rearward from the pair of terminal fittings 10 extends rearward from the rear end of the housing 30 (the rear end of the insertion portion 33) (see FIG. 1). If necessary, a packing that is sandwiched between an outer peripheral surface of the electric wire 20 and an inner peripheral surface of the terminal storing chamber to seal an annular gap therebetween, a holder that prevents the packing from falling off to the rear side, or the like may be provided.

Next, the shield shell 40 and the seal member 50 will be described. As shown in FIGS. 1 and 2, the shield shell 40 made of metal has a tubular shape extending in the front-rear direction so as to be externally inserted into the insertion portion 33 of the housing 30. The shield shell 40 is mounted to the insertion portion 33 of the housing 30 from the rear side, and has a function of preventing electromagnetic noise from being transmitted to the pair of electric wires 20 located inside the housing 30.

The seal member 50 has a function of sealing an annular gap between the insertion portion 33 of the housing 30 and the shield shell 40 externally inserted into the insertion portion 33. As shown in FIGS. 2 and 3, the rubber seal member 50 includes a tubular main body portion 51 extending in the front-rear direction and an annular protrusion 52 protruding inward in a radial direction from a front end of the main body portion 51. A plurality of annular lips 51*a* protruding outward in the radial direction and arranged at intervals in the front-rear direction are formed on an outer peripheral surface of the main body portion 51, and a plurality of annular lips 51*b* protruding inward in the radial direction and arranged at intervals in the front-rear direction are formed on an inner peripheral surface of the main body portion 51.

The seal member 50 is disposed so as to be sandwiched between the insertion portion 33 of the housing 30 and the shield shell 40 (see FIG. 2). Therefore, first, the seal member 50 is mounted on the insertion portion 33 from the rear side such that the protrusion 52 enters the annular groove portion 34 and the main body portion 51 covers an outer periphery of the insertion portion 33 (see FIG. 2). In this state, the protrusion 52 of the seal member 50 entering the annular groove portion 34 exhibits a function of preventing the seal member 50 from falling off to the rear side from the insertion portion 33. Next, the shield shell 40 is mounted on the insertion portion 33 so as to be externally inserted into the insertion portion 33 from the rear side (see FIG. 2). In a state in which the shield shell 40 is completely mounted, as shown in FIG. 2, a locking piece 41 provided in the shield shell 40 and a locking hole 36 provided in an outer periphery of the insertion portion 33 are engaged with each other, so that the shield shell 40 is prevented from falling off to the rear side from the housing 30.

When the shield shell 40 is mounted, the main body portion 51 of the seal member 50 is pressed and sandwiched between the insertion portion 33 of the housing 30 and the shield shell 40. As a result, the main body portion 51 exerts a function of sealing the annular gap between the insertion portion 33 and the shield shell 40. In a state where the main body portion 51 is pressed and sandwiched between the insertion portion 33 and the shield shell 40, the annular lips 51*a* and 51*b* are compressed. Therefore, a height of the main body portion 51 in the radial direction (a distance between a distal end of the annular lip 51*a* and a distal end of the annular lip 51*b*) is reduced from a pre-assembly height H1 before being sandwiched between the insertion portion 33 and the shield shell 40 to a post-assembly height H2 (see FIG. 2).

Next, a boot 60 will be described. As shown in FIG. 1, the boot 60 made of rubber has a tubular shape extending in the front-rear direction, and integrally includes a large diameter portion 61 that covers an outer periphery of the shield shell 40, a small diameter portion 62 that covers the outer peripheries of the pair of electric wires 20 extending rearward from the shield shell 40, and a connecting portion 63 that connects the large diameter portion 61 and the small diameter portion 62. The boot 60 is relatively moved forward with respect to the pair of electric wires 20 from a state in which the pair of electric wires 20 is inserted through the boot 60, and the large diameter portion 61 of the boot 60 is mounted on the outer periphery of the shield shell 40, so that the boot 60 is mounted on the shield shell 40 and the pair of electric wires 20. The boot 60 has a function of protecting the pair of electric wires 20 extending rearward from the shield shell 40.

Next, the packing 70 will be described. As shown in FIG. 1, the rubber packing 70 made of rubber has a tubular shape extending in the front-rear direction, and has a flat shape elongated in the width direction corresponding to an outer peripheral shape of the fitting portion 32 of the housing 30 when viewed in the front-rear direction. The packing 70 is mounted on the outer periphery of the fitting portion 32 of the housing 30 from the front side (see FIG. 1). In a state in which the tubular counterpart fitting portion of the counterpart connector is externally inserted into the fitting portion 32 by fitting of the connector 1 and the counterpart connector, the packing 70 mounted on the fitting portion 32 is pressed and sandwiched between an outer peripheral surface of the fitting portion 32 and an inner peripheral surface of the counterpart fitting portion. This provides a function of sealing a gap between the fitting portion 32 and the counterpart fitting portion. The members constituting the connector 1 have been described above.

The assembled connector 1 is fitted to the counterpart connector. In order to fit the connector 1 and the counterpart connector to each other, a tubular counterpart fitting portion of the counterpart connector is externally inserted into the fitting portion 32 of the connector 1. As a result, the connector 1 can function as a relay connector that electrically connects the pair of electric wires 20 and the counterpart connector.

Next, rubber hardness and a compression ratio of the seal member 50 will be described. As described above, the main body portion 51 of the seal member 50 exerts a function of sealing the annular gap between the insertion portion 33 and the shield shell 40 by being pressed and sandwiched between the insertion portion 33 of the housing 30 and the shield shell 40. A size of the annular gap between the insertion portion 33 and the shield shell 40 may vary depending on manufacturing tolerances of the housing 30 and the shield shell 40. Therefore, it is preferable that the main body portion 51 of the seal member 50 has a characteristic capable of appropriately absorbing such a change in the size of the annular gap due to the manufacturing tolerance and maintaining airtightness of the annular gap. Hereinafter, for convenience of description, a value obtained by dividing the compressed height ($\Delta H = H1 - H2$), which is a difference between the pre-assembly height H1 and the post-assembly height H2, by the pre-assembly height H1 is defined as a "compression ratio".

According to tests and considerations by the inventor, it has been found that, as compared with other cases, when rubber hardness of the seal member 50 is 30 degrees or more and 50 degrees or less, and the compression ratio is 0.1 or more and 0.4 or less, the main body portion 51 of the seal member 50 can appropriately absorb the change in the size of the annular gap due to the manufacturing tolerances of the housing 30 and the shield shell 40, and can also maintain the airtightness of the annular gap. Here, a value of the rubber hardness can be measured, for example, in accordance with a test method defined in JIS K 6253, where JIS is Japan Industrial Standards.

Specifically, assuming that a variation width in size of the annular gap due to the manufacturing tolerance is 1.2 mm (±0.6 mm), the airtightness is determined to be "passed" when the airtightness of the annular gap is 50 kPa or more, and the airtightness is determined to be "failed" when the airtightness of the annular gap is less than 50 kPa. When the rubber hardness of the seal member 50 is 30 degrees or more and 50 degrees or less, and the compression ratio is 0.1 or more and 0.4 or less, the airtightness is "passed" regardless of the size of the annular gap within the range of the variation width. On the other hand, in a case where the rubber hardness of the seal member 50 is not 30 degrees or more and 50 degrees or less, or in a case where the compression ratio is not 0.1 or more and 0.4 or less, the airtightness is "failed" when the size of the annular gap is a certain value within the range of the variation width.

<Functions and Effects>

As described above, according to the connector 1 of the present embodiment, when the rubber hardness of the seal member 50 is 30 degrees or more and 50 degrees or less, and the value obtained by dividing the compressed height, which is the difference between the pre-assembly height H1 of the main body portion 51 of the seal member 50 before being sandwiched between the housing 30 and the shield shell 40 and the post-assembly height H2 of the main body portion 51 of the seal member 50 when being sandwiched between the housing 30 and the shield shell 40, by the pre-assembly height H1 is 0.1 or more and 0.4 or less, it is possible to appropriately absorb the manufacturing tolerance and to maintain the airtightness. Therefore, it is possible to provide the connector 1 using the seal member 50 capable of appropriately maintaining the sealing performance.

Other Embodiments

The present disclosure is not limited to the above embodiment, and various modifications can be adopted within the scope of the present invention. For example, the present disclosure is not limited to the above embodiment, and may be appropriately modified, improved or the like. In addition, the material, shape, size, number, arrangement position or the like of each component in the above-described embodiment are optional and are not limited as long as the present disclosure can be achieved.

In the above-described embodiment, the seal member 50 includes the tubular main body portion 51 extending in the front-rear direction and the annular protrusion 52 protruding inward in the radial direction from the front end of the main body portion 51. Alternatively, the seal member 50 may be formed of only the tubular main body portion 51 extending in the front-rear direction.

Here, the connector 1 according to the embodiment of the present disclosure described above will be briefly summarized and listed in [1] below.

[1] A connector (1) including:

a terminal fitting (10);

an electric wire (20) connected to the terminal fitting (10);

a housing (30) in which the terminal fitting (10) is stored, the housing (30) constituting a fitting part (32) with a counterpart connector;

a shield shell (40) disposed so as to surround an outer periphery of the housing (30); and a seal member (50) made of rubber and sandwiched between the housing (30) and the shield shell (40), wherein the seal member (50) has a rubber hardness of 30 degrees or more and 50 degrees or less, and wherein a value obtained by dividing a compressed height (ΔH), which is a difference between a first height (H1) of the seal member (50) before being sandwiched between the housing (30) and the shield shell (40) and a second height (H2) of the seal member (50) when being sandwiched between the housing (30) and the shield shell (40), by the first height (H1) is 0.1 or more and 0.4 or less.

According to tests and considerations by the inventor, as in the connector having the configuration of above [1], when rubber hardness of the seal member is 30 degrees or more and 50 degrees or less, and a value obtained by dividing the compressed height, which is the difference between the first height of the seal member before being sandwiched between the housing and the shield shell and the second height of the seal member when being sandwiched between the housing and the shield shell, by the first height is 0.1 or more and 0.4 or less, airtightness can be maintained while manufacturing tolerance can be appropriately absorbed. Therefore, it is possible to provide the connector using the seal member capable of appropriately maintaining the sealing performance. A value of the rubber hardness described above can be measured, for example, in accordance with a test method defined in JIS K 6253.

What is claimed is:

1. A connector comprising:

a terminal fitting;

an electric wire connected to the terminal fitting;

a housing in which the terminal fitting is stored, the housing constituting a fitting part with a counterpart connector;

a shield shell disposed so as to surround an outer periphery of the housing; and a seal member made of rubber and sandwiched between the housing and the shield shell, wherein the seal member has a rubber hardness of 30 degrees or more and 50 degrees or less, wherein the seal member has a first height before being sandwiched between the housing and the shield shell, and a second height when being sandwiched between the housing and the shield shell, and a compression height that is a difference between the first height and the second height, wherein the seal member has a compression ratio that is 0.1 or more and 0.4 or less, the compression ratio is obtained by dividing the compression height by the first height, and wherein the seal member includes a main body portion and an annular protrusion that protrudes radially inwardly from main body portion.

2. The connector according to claim 1, wherein the housing includes an annular groove, and wherein the main body portion is outside of the annular groove, and the annular protrusion extends into the annular groove.

* * * * *